(12) United States Patent
Fukaishi et al.

(10) Patent No.: US 7,753,529 B2
(45) Date of Patent: Jul. 13, 2010

(54) IMAGE DISPLAY DEVICE

(75) Inventors: Kei Fukaishi, Niigata (JP); Yoshihiro Yoshihara, Niigata (JP); Hiroshi Maruyama, Niigata (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 1105 days.

(21) Appl. No.: 11/394,736

(22) Filed: Mar. 31, 2006

(65) Prior Publication Data
US 2006/0227068 A1   Oct. 12, 2006

(30) Foreign Application Priority Data
Mar. 31, 2005   (JP)   ............................. 2005-104103

(51) Int. Cl.
*G03B 21/14*   (2006.01)
(52) U.S. Cl. ............................. 353/7; 349/15; 359/472; 362/54
(58) Field of Classification Search ............... 353/7, 353/8, 10; 349/15; 359/458, 462, 464, 466, 359/472, 475, 477; 348/42, 51, 52–60
See application file for complete search history.

(56) References Cited

U.S. PATENT DOCUMENTS

| | | | |
|---|---|---|---|
| 6,337,721 B1 | 1/2002 | Hamagishi et al. | |
| 7,064,895 B2* | 6/2006 | Morishima et al. | 359/463 |
| 7,144,113 B2* | 12/2006 | Fujikawa et al. | 353/7 |
| 7,230,759 B2* | 6/2007 | Huang et al. | 359/465 |
| 7,355,658 B2* | 4/2008 | Ioki et al. | 349/15 |
| 7,425,069 B2* | 9/2008 | Schwerdtner et al. | 353/7 |
| 7,436,594 B2* | 10/2008 | Van Berkel et al. | 359/462 |
| 2002/0030887 A1 | 3/2002 | Hamagishi et al. | |
| 2005/0168815 A1* | 8/2005 | Maruyama et al. | 359/465 |
| 2006/0192746 A1* | 8/2006 | Ioki et al. | 345/102 |
| 2006/0221444 A1* | 10/2006 | Fukaishi et al. | 359/472 |

FOREIGN PATENT DOCUMENTS

JP    03-089236 A    4/1991

(Continued)

OTHER PUBLICATIONS

Notice to Submit a Response issued in Korean Application No. 9-5-2008-055514453 dated Oct. 31, 2008 and English translation thereof, 6 pages.

(Continued)

*Primary Examiner*—William C Dowling
(74) *Attorney, Agent, or Firm*—Osha • Liang LLP

(57) ABSTRACT

An image display device which displays an image to a viewer in front thereof without cross-talk and displays a two-dimensional image in wider space is provided. The image display device which projects an image on the viewer includes; a light source unit which emits light to the viewer; an imaging section in which an image is formed; optical means in which the light emitted from the light source unit is transmitted to enter the imaging section; and a viewing angle controller which diffuses and spreads the light directed to the left eye of the viewer in the left area from the left eye of the viewer, and the light directed to the right eye of the viewer in the right area from the right eye of the viewer.

17 Claims, 8 Drawing Sheets

FOREIGN PATENT DOCUMENTS

| | | |
|---|---|---|
| JP | 4-177236 | 6/1992 |
| JP | 8-149520 | 6/1996 |
| JP | 8-307907 | 11/1996 |
| JP | 10-63199 | 3/1998 |
| JP | 2001-066547 A | 3/2001 |
| JP | 2004-272040 | 9/2004 |
| JP | 2005018056 A | 1/2005 |

OTHER PUBLICATIONS

Patent Abstracts of Japan, Publication No. 10-063199, Publication Date: Mar. 6, 1998, 2 pages.

Patent Abstracts of Japan, Publication No. 08-307907, Publication Date: Nov. 22, 1996, 1 page.

Patent Abstracts of Japan, Publication No. 08-149520, Publication Date: Jun. 7, 1996, 1 page.

Patent Abstracts of Japan, Publication No. 04-177236, Publication Date: Jun. 24, 1992, 1 page.

Patent Abstracts of Japan, Publication No. 2004-272040, Publication Date: Sep. 30, 2004, 1 page.

Patent Act 1977: Search Report under Section 17(5) issued in British Application No. GB0606593.2 dated Jul. 7, 2006, 3 pages.

English Patent Abstract of JP03089236, Publication Date Apr. 15, 1991, 1 page.

English Patent Abstract of JP2005-018056, Publication Date Jan. 20, 2005, 1 page.

* cited by examiner

IMAGE DISPLAY DEVICE

CROSS REFERENCE TO RELATED APPLICATION

The present application claims priority from a Japanese Patent Application No. JP 2005-104103 filed on Mar. 31, 2005, the contents of which are incorporated herein by reference.

BACKGROUND OF THE INVENTION

1. Field of the Invention

The present invention relates to an image display device. Especially, the present invention relates to an image display device having a wide viewing angle.

2. Related Art

Conventionally, for example Patent document 1: Japanese patent application publication No. 1998-63199, discloses that image display devices which project parallax images on the left and right eyes of a viewer to display a three-dimensional (3D) image include a diffuser which diffuses and spreads light in vertical direction to expand the viewing angle thereof.

According to Japanese Patent Application Publication 1998-63199, if another diffuser which diffuses and spreads light horizontally besides the diffuser which diffuses and spreads light vertically are used in the image display device, the parallax images for the left eye and the right eye are projected not only on the respective desired eyes but also on the opposite eyes, which causes cross-talk. In the conventional, displaying a 3D image, the image display device cannot use such diffuser which diffuses and spreads light in horizontal direction so that the viewing angle thereof cannot be expanded.

SUMMARY OF THE INVENTION

To solve the above problem, according to the first invention, an image display device which projects an image on a viewer includes; a light source unit from which light is emitted to the viewer; an imaging section in which an image is formed; optical means through which the light emitted from the light source unit is transmitted to enter the imaging section; and a viewing angle controller with which the light directed to the left eye of the viewer is diffused and spread into the left area from the left eye of the viewer and the light directed to the right eye of the viewer is diffused and spread into the right area from the right eye of the viewer.

In the above image display device, the light source unit may include a lighting component for left eye which emits light to the left eye of the viewer and a lighting component for right eye which emits light to the right eye of the viewer. The imaging section may include left eye image forming regions in which an image for left eye of the parallax images is formed and right eye image forming regions in which an image for right eye of the parallax images is formed. The optical means may allow the light emitted from the left eye lighting component to enter the left eye image forming regions of the imaging section and the light emitted from the right eye lighting component to enter the right eye image forming regions of the imaging section.

In the above image display device, the viewing angle controller may diffuse and spread the incident light having an incident angle equal to or larger than the angle $\theta_1$ in the direction of a larger angle than the incident angle. The $\theta_1$ is defined as $\theta_1 = \tan^{-1}((y_1-y_2)/x)$ where $y_1$ is the half of the horizontal effective length of the image display device, $y_2$ is the half of the distance between the left and right eyes of the viewer, and x is the distance between the image display device and the viewer.

The above image display device may further include a unidirectional diffuser through which diff-uses and spreads the light exiting from the imaging section in vertical direction.

In the above image display device, the viewing angle controller may be assembled closer to the viewer than the unidirectional diffuser. The viewing angle controller may be assembled between the imaging section and the unidirectional diffuser.

In the above imaging display device, the optical means may include; a light source unit polarizer set which polarizes the lights emitted from the left eye lighting component and the right eye lighting component to give respective polarizing directions which are perpendicular to each other; a condenser lens by which the light emitted from the left eye lighting component and polarized by the light source unit polarizer set is focused on the left eye of the viewer and the light emitted from the right eye lighting component and polarized by the light source unit polarizer set is focused on the right eye of the viewer; and a micropatterned retarder which modifies the incident lights entering the left eye image forming regions and the right eye image forming regions to make the respective polarization directions perpendicular to each other. The viewing angle controller may be assembled between the condenser lens and the micropatterned retarder.

The above description of the present invention doesn't cite all the features of the present invention. The sub-combinations of these features may also be inventions.

Apparently from the above description, according to the present invention, the image display device can display an image to a viewer near in front thereof with small cross-talk, and to another viewer in the left or right sides of the front viewer with a wide viewing angle.

DETAILED DESCRIPTION OF THE INVENTION

The present invention will now be described with reference to following embodiments. The embodiments described below do not limit the invention claimed herein. All of the combinations described on the embodiments are not essential to the solutions of the present invention.

Figure 1:
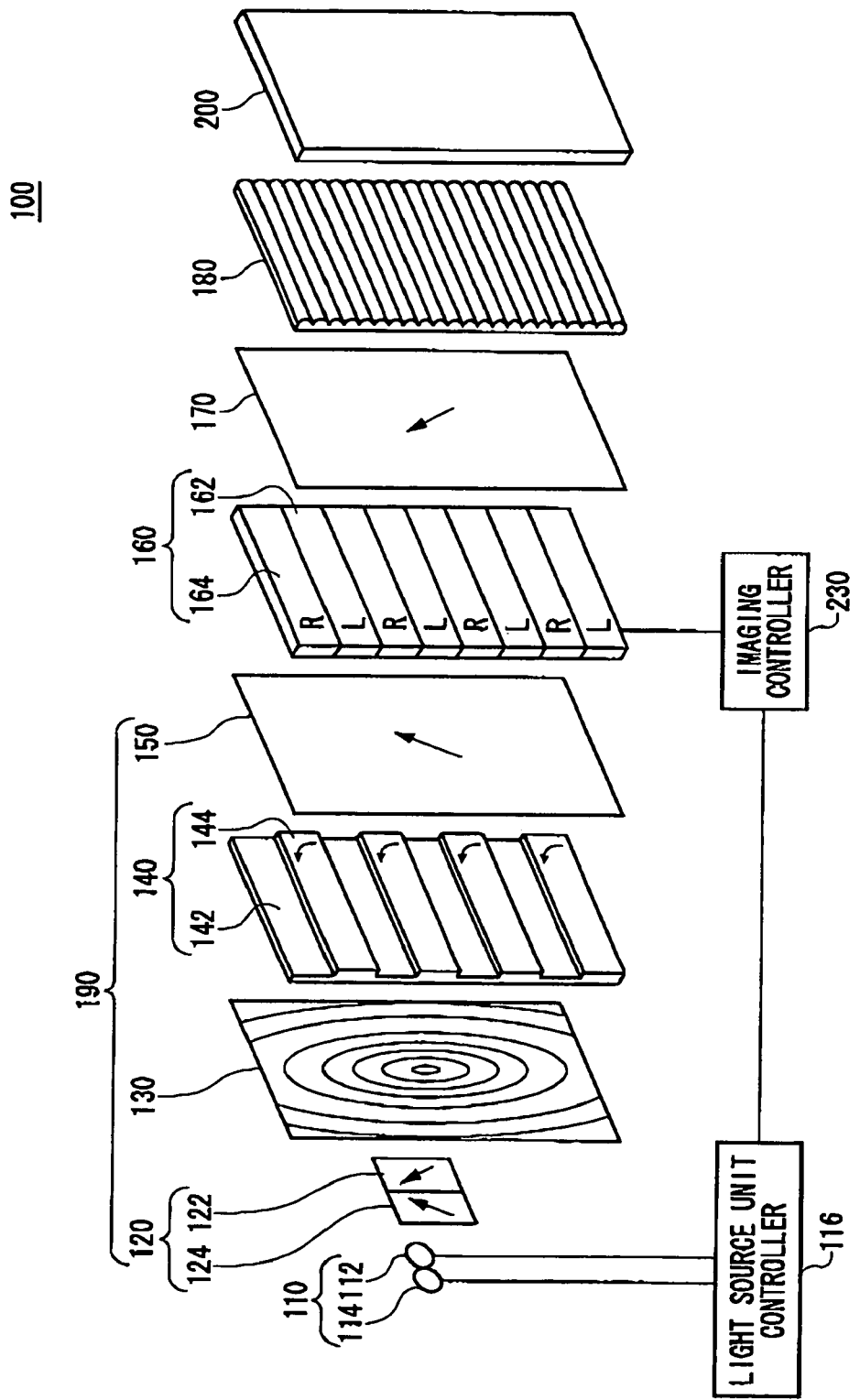
FIG. 1 is an exploded perspective view of the image display device 100 related to the present embodiment.
Figure 2:
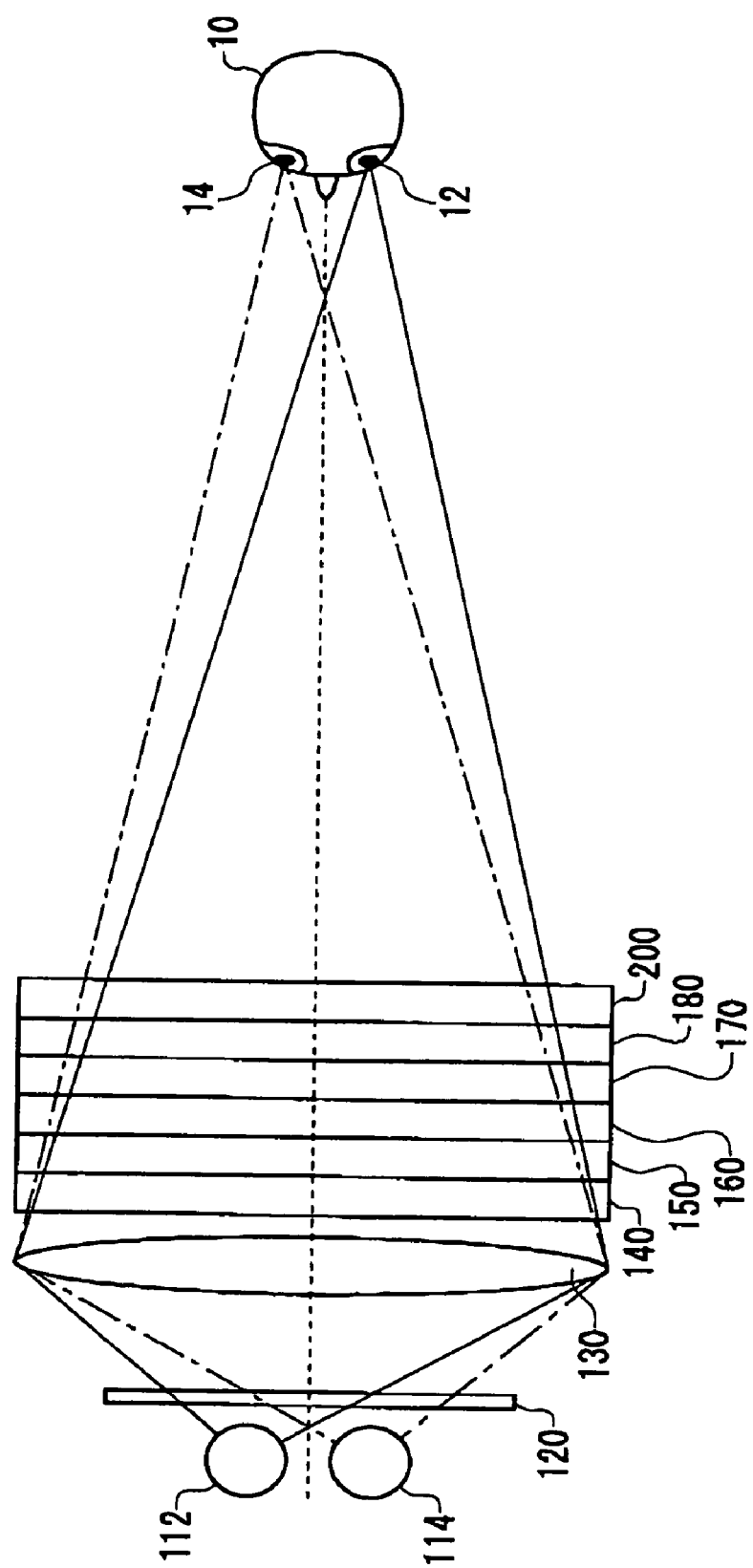
FIG. 2 is a schematic plane view of the image display device 100.

FIG. 1 is an exploded perspective view of the image display device 100 related to the embodiment of the present invention. FIG. 2 is a schematic plane view showing the image display device 100 schematically. The image display device 100 projects the parallax images on respectively the left eye 12 and the right eye 14 of the viewer 10 to display a 3D image.

As shown in FIG. 1, the image display device 100 includes a light source unit 110, optical means 190, an imaging section 160, a liquid crystal polarizer 170, a unidirectional diffuser 180, and a viewing angle controller 200, each of which is assembled in this order toward the viewer. The image display device 100 further includes a light source unit controller 116 which controls the light source unit 110, and an imaging controller 230 which controls the imaging section 160. The imaging section includes left eye image forming regions 162 and right eye image forming regions 164, which are described later.

As shown in FIGS. 1 and 2, the light source unit 110 includes a pair of a left eye lighting component 112 and a right eye lighting component 114. The left eye lighting component 112 is set in the right side of the optical center of the image display device 100 as the viewer 10 faces and emits light to the left eye 12 of the viewer 10. The right eye lighting component 114 is set in the left side of the optical center of the image display device 100 as the viewer 10 faces and emits light to the right eye 14 of the viewer 10. The left eye lighting component 112 and the right eye lighting component 114 emit unpolarized light.

The optical means 190 allow the light emitted from the left eye lighting component 112 to enter the left eye image forming regions 162 of the imaging section 160, and the light emitted from the right eye lighting component 114 to enter the right eye image forming regions 164 of the imaging section 160.

In the system shown in FIG. 1, the optical means 190 include a light source unit polarizer set 120, a condenser lens 130, a micropatterned retarder 140, and a liquid crystal polarizer 150, each of which is assembled in this order from the light source unit 110 to the imaging section 160.

The light source unit polarizer set 120 polarizes the light emitted from the left eye lighting component 112 and the light emitted from the right eye lighting component 114 to give respective polarization directions which are perpendicular to each other.

In the system shown in FIG. 1, the light source unit polarizer set 120 consists of a polarizer for left eye 122 which the light emitted from the left eye lighting component 112 enters and a polarizer for right eye 124 which the light emitted from the right eye lighting component 114 enters.

The polarizer for left eye 122, therefore, polarizes the incident unpolarized light emitted from the left eye lighting component 112 and filters the light having a certain oscillating direction of electric field, for example, of −45 degrees to be a linearly polarized light.

The polarizer for right eye 124 polarizes the incident unpolarized light emitted from the right eye lighting component 114 to be transmitted with the polarization direction which is perpendicular to the polarization direction of the polarizer for left eye 122, that is in the above case with the oscillating direction of the electric field of +45 degrees to be a linearly polarized light.

The condenser lens 130 focuses the light emitted from the light source unit 110 to the viewer 10.

In the system shown in FIG. 1, the condenser lens 130 is a Fresnel lens. As shown in FIG. 2, the condenser lens 130 focuses the light emitted from the left eye lighting component 112 and polarized by the polarizer for left eye 122 to the left eye 12 of the viewer 10 and the light emitted from the right eye lighting component 114 and polarized by the polarizer for right eye 124 to the right eye 14 of the viewer 10.

The micropatterned retarder 140 is a sheet which functions to control the polarization axis of the lights. In the present embodiment, the micropatterned retarder 140 changes the polarization of the lights emitted from the light source unit 110, exit from the condenser lens 130, and have a certain polarization direction to the polarization direction perpendicular to the certain polarization direction.

In the system shown in FIG. 1, the micropatterned retarder 140 has a plurality of nonretarding regions 142 and a plurality of retarding regions 144 which are horizontally elongated strips and arrayed alternately in vertical direction. The non-retarding regions 142 maintain the polarization direction of the incident light to be transmitted. The retarding regions 144 rotate the polarization direction of the incident light to be transmitted by 90 degrees. For the retarding regions 144, for example, a half wave retarder is used. A liquid crystal panel may be also used instead of the half wave retarder.

The liquid crystal polarizer 150 has a unique single polarization direction, in which the polarized light having the polarization direction which is parallel to that of the liquid crystal polarizer 150 is transmitted, and the polarized light having the polarization direction which is perpendicular to that of the liquid crystal polarizer 150 is cut off. The liquid crystal polarizer 150 is assembled closer to the light source unit 110 than the imaging section 160. The liquid crystal polarizer 170 has a unique single polarization direction which is perpendicular to that of the liquid crystal polarizer 150, in which the polarized light having the polarization direction which is parallel to that of the liquid crystal polarizer 170 is transmitted, and the polarized light having the polarization direction which is perpendicular to that of the liquid crystal polarizer 170 is cut off. The liquid crystal polarizer 170 is assembled closer to the viewer 10 than the imaging section 160. In the system shown in FIG. 1, the liquid crystal polarizer 150 has the polarization direction of +45 degrees, and the liquid crystal polarizer 170 has the polarization direction of −45 degrees.

The imaging section 160 includes left eye image forming regions 162 in which an image for left eye of parallax images is formed, and right eye image forming regions 164 in which an image for right eye of parallax images is formed. The imaging section 160 comprises a plurality of pixels arrayed in plane horizontally and vertically. In the system shown in FIG. 1, the imaging section 160 includes horizontally elongated strips of left eye image forming regions 162 and right eye image forming regions 164 which are arrayed alternately in vertical direction. The size and position of the left eye image forming region 162 and the right eye image forming region 164 correspond to those of the retarding region 144 and nonretarding region 142 of the micropatterned retarder 140.

The unidirectional diffuser 180 is, for example, a sheet which diffuses and spreads the light exiting from the imaging section 160 in vertical direction. The unidirectional diffuser 180 is, for example, a lenticular lens sheet which includes a plurality of horizontally elongated semi-cylindrical lenses arrayed in vertical direction.

The viewing angle controller 200 diffuses and spreads the light directed to the left eye 12 of the viewer 10 into the left area from the left eye 12 of the viewer, and the light directed to the right eye 14 of the viewer 10 into the right area from the right eye 14. The viewing angle controller 200 is, for example, a polymer film through which the incident light having a smaller incident angle than a certain angle is transmitted directly, and the incident light having a larger incident angle than the certain angle is scattered and transmitted. The polymer film is, for example, Lumisty® manufactured by Sumitomo Chemical Co., Ltd., which is referred in Taisuke Okita: Hikari seigyo kinou wo yusuru koubunnsi-maku—Lumisty® (light control polymer film—Lumisty®), Sumitomo Chemical 1991-I [in Japanese].

Figure 3A:
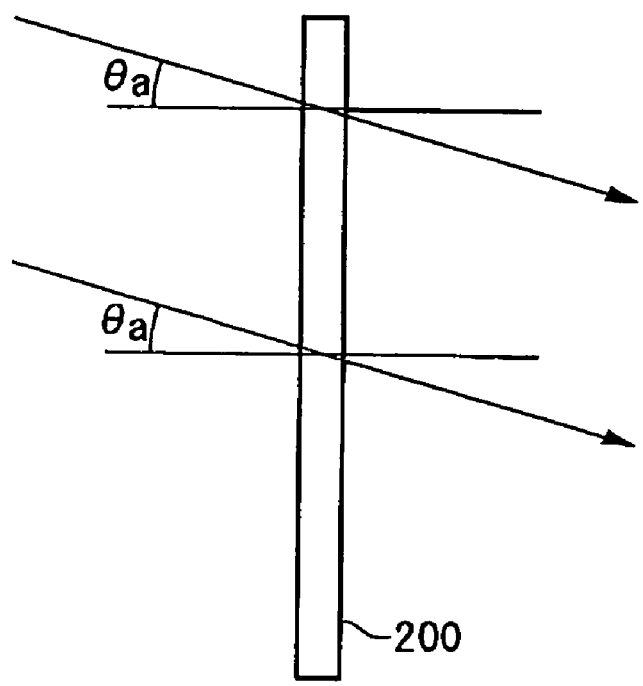
FIGS. 3A and 3B are schematic views showing how the viewing angle controller controls light.
Figure 3B:
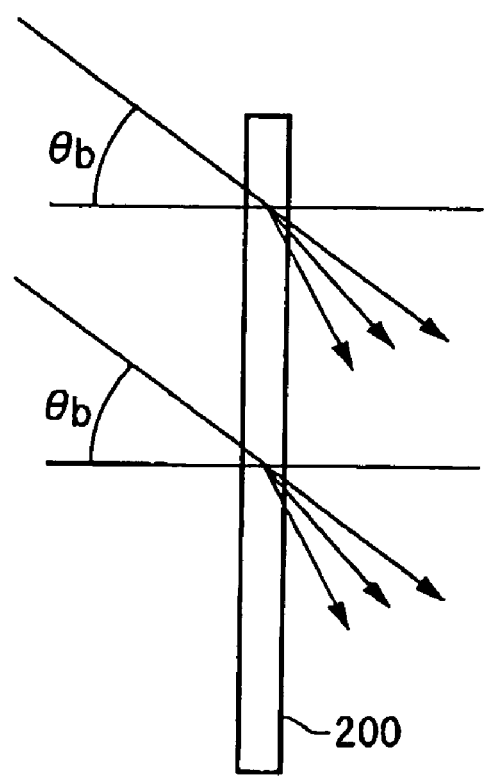

FIGS. 3A and 3B are schematic views of how the viewing angle controller 200 controls light. FIG. 3A shows the light control of the viewing angle controller 200 when the light enters the viewing angle controller 200 at the incident angle $\theta_a$ which is smaller than a given angle $\theta_1$, and FIG. 3B shows the light control of the viewing angle controller 200 when the light enters the viewing angle controller 200 at the incident angle $\theta_b$ which is equal to or larger than the given angle $\theta_1$.

As shown in FIG. 3A, the viewing angle controller 200 allows the incident light having the incident angle $\theta_a$ which is smaller than the given angle $\theta_1$ to be transmitted directly.

As shown in FIG. 3B, the viewing angle controller 200 allows the incident light having the incident angle $\theta_b$ which is equal to or larger than the given angle $\theta_1$ to be scattered and transmitted.

In this case, the viewing angle controller 200 allows the incident light having the incident angle $\theta_b$ to be diffused and transmitted at the larger angle than the incident angle $\theta_b$.

Figure 4:
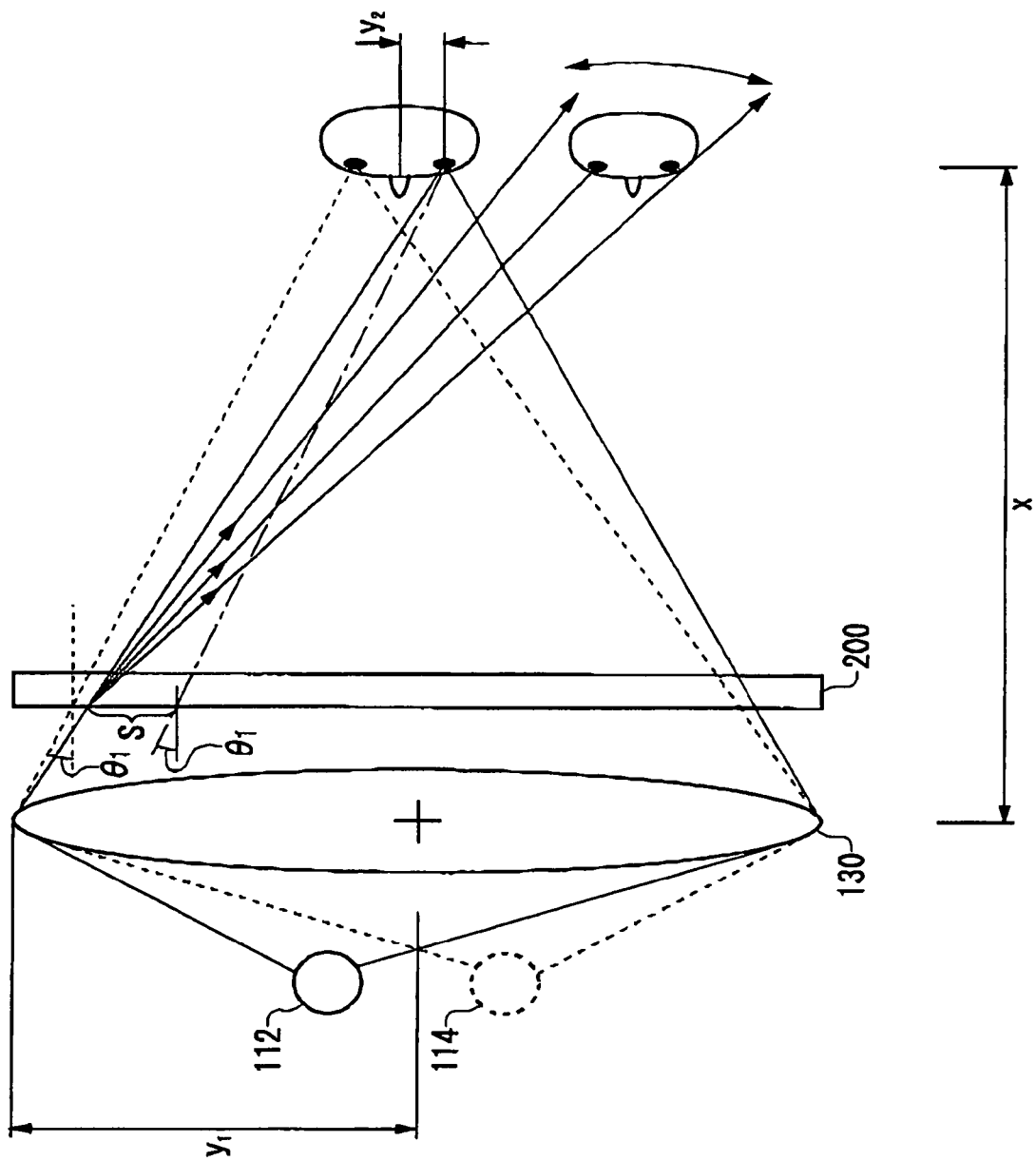
FIG. 4 is a schematic view showing how the image display device 100 works to display an image.

FIG. 4 is a schematic plane view showing how the image display device 100 displays an image. In the system shown in FIG. 4, it is preferred that the $\theta_1$ which is the threshold angle to decide whether the incident light is transmitted directly or scattered and transmitted through the viewing angle controller 200 is determined as below. $\theta_1$ is defined as $\theta_1 = \tan^{-1}((y_1 - y_2)/x)$ where $y_1$ is the half of the horizontal effective length of the image display device 100, $y_2$ is the half of the distance between the left eye 12 and the right eye 14 of the viewer 10, and x is the distance between the image display device 100 and the viewer 10. The angle $\theta_1$ the viewing angle controller 200, which is defined in such way depends on the manufacturing conditions of the viewing angle controller 200. In the above said Lumisty®, for example, each layer of the laminated polymer film is controlled the orientation in the layer to control the angle $\theta_1$.

The viewing angle controller 200 diffuses and spreads light asymmetrically. Therefore, it is preferrable that the incident light is diffused and spread such that the main diffusion angle is larger than the incident angle.

The image display device 100, therefore, can display an image to the viewer 10 near in front of the image display device 100 with small crosstalk. In FIG. 4, for the purpose of simple description, only the rightmost light ray out of the incident light entering the viewing angle controller 200 is drawn. In such system, the incident light having an incident angle equal to or larger than the incident angle $\theta_1$ and passing through the area S is scattered and transmitted.

In the above system, how the image display device 100 works to display a 3D image to the viewer 10 in the position is explained using the systems shown in FIGS. 1 and 4. When the imaging section 230 is input the instruction of displaying a 3D image, the imaging section 230 outputs the instruction of turning on the left eye lighting component 112 and the right eye lighting component 114 to the light source unit controller 116. The imaging section 230 also forms the left eye image of parallax images on the left eye image forming regions 162, and the right eye image of parallax images on the right eye image forming regions 164.

Under the instruction of the imaging section 230, the light source unit controller 116 turns on both the left eye lighting component 112 and the right eye lighting component 114. The unpolarized light emitted from the left eye lighting component 112 is polarized and filtered by the polarizer for left eye 122 to be the linearly polarized light having the oscillating direction of electric field of −45 degrees.

The linearly polarized light is directed to and focused on the left eye 12 of the viewer 10 by the condenser lens 130. The linearly polarized light exiting from the condenser lens 130 and having the polarization direction of −45 degrees enters the micropatterned retarder 140.

The linearly polarized light is transmitted through the nonretarding regions 142 of the micropatterned retarder 140 as maintaining the incident polarization direction of −45 degrees. The linearly polarized light transmitted through the nonretarding regions 142 and having the polarization direction of −45 degrees enters the liquid crystal polarizer 150. The liquid crystal polarizer 150 has the polarization direction of +45 degrees, which is perpendicular to the polarization direction of the linearly polarized light transmitted through the nonretaring regions 142. The light emitted from the left eye lighting component 112 and transmitted through the nonretarding regions 142 is, therefore, cut off by the liquid crystal polarizer 150. The light emitted from the left eye lighting component 112 cannot reach the right eye image forming regions 164 aligned corresponding to the nonretarding regions 142. The right eye image of parallax images formed on the right eye image forming regions 164 cannot be projected on the left eye 12 of the viewer 10.

The retarding regions 144 of the micropatterned retarder 140 allows the incident linearly polarized light having the polarization direction of −45 degrees to be rotated the polarization direction by 90 degrees and to be transmitted as a linearly polarized light having the polarization direction of +45 degrees. The light emitted from the left eye lighting component 112 is transmitted through the retarding regions 144 to be the linearly polarized light whose polarization direction is parallel to that of the liquid crystal polarizer 150. The linearly polarized light is, therefore, transmitted through the liquid crystal polarizer 150. When the light transmitted through the liquid crystal polarizer 150 is transmitted through the left eye image forming regions 162 which are aligned corresponding to the retarding regions 144, the light is rotated the polarization direction thereof by 90 degrees to be the linearly polarized light having the polarization direction of −45 degrees. The light projecting the left eye image of parallax images formed on the left eye image forming regions 162 is transmitted directly through the liquid crystal polarizer 170, diffused and spread by the unidirectional diffuser 180 in vertical direction.

The viewing angle controller 200 allows the light transmitted through the unidirectional diffuser, entering there with the incident angle which is smaller than the angle $\theta_1$ to be transmitted directly therethrough. The left eye image of parallax images related to the light exiting from the viewing angle controller in the angle range of between the horizontal center of the viewing angle controller 200 and $\theta_1$ in the relation of the left eye 12 of the viewer 10 is projected on the left eye 12. The light emitted from the left eye lighting component 112 is focused on the vertical line included the left eye 12, and the left eye image of parallax images formed on the left eye image forming regions 162 is projected on the left eye 12.

The viewing angle controller 200 allows the light transmitted through the unidirectional diffuser 180 and having the incident angle which is equal to or larger than the angle $\theta_1$ to be scattered and transmitted. As shown in FIG. 4, the left eye image of parallax images formed on the left eye image forming regions 162 is projected on the viewer 10 in the left side of the front of the image display device. In this case, the viewing angle controller 200 allows the incident light having the incident angle which is equal to or larger than the angle $\theta_1$ to be scattered and transmitted at the larger angle than the incident angle. This prevents the diffused and scattered light related to the left eye image of parallax images from entering the right eye 14 of the viewer 10, or prevents cross-talk.

Similarly, the light emitted from the right eye lighting component 114 is polarized by the polarizer for right eye 124 to have the polarization direction of +45 degrees. The light transmitted through the polarizer for right eye 124 and the nonretarding regions 142 is projected the right eye image of parallax images formed on the right eye image forming regions 164 on the right eye 14 of the viewer 10 The viewing angle controller 200 allows the incident light which is transmitted through the unidirectional diffuser 180 and enters at the incident angle which is smaller than the angle $\theta_1$ to be transmitted directly. The viewing angle controller 200 also allows the incident light which is transmitted through the unidirectional diffuser 180 and enters at the incident angle which is equal to or larger than the angle $\theta_1$ to be scattered and transmitted at the larger angle than the incident angle. The light transmitted directly through the viewing angle controller 200 is projected on the right eye of the viewer 10, and the light scattered and transmitted by the viewing angle controller 200 is projected on the viewer 10 in the right side of the front of the image display device. The light transmitted through the polarizer for right eye 124 and the retarding regions 144 is cut off so that the left eye image of parallax images formed on the left eye image forming regions 162 isn't projected on the left eye 12 of the viewer 10.

As described above, the image display device 100 can display a 3D image by projecting parallax images on the viewer 10 near in front of the image display device 100. In this case, the image display device 100 can project the parallax images with small cross-talk to the viewer 10 near in front of the image display device 100, and also can display either of the parallax images to one or more persons in the left and/or right sides of the one or more viewers 10 with a wide viewing angle.

When the 3D image is displayed, both the left eye lighting component 112 and the right eye lighting component 114 are turned on. This can prevent blinking or flicker which is perceived by the viewer 10 when the left eye lighting component 112 and right eye lighting component 114 are alternately turned on.

The unidirectional diffuser 180 is employed so that the 3D image can be displayed with a vertically wide viewing angle. The viewing angle controller 200 is assembled closer to the viewer 10 than the unidirectional diffuser 180 so that the viewing angle controller 200 can be employed in the existing design of image display device without a major change.

Embodiment 1

For the viewing angle controller 200 included in the image display device, Lumisty® MFZ-2555 which diffuses the incident light having the incident angle in the angle range from 25 degrees to 55 degrees is used. For the unidirectional diffuser 180, the lenticular lens sheet having the lens pitch of 40 µm is used. Brightness of the 7-inch image display device 100 is measured in 560 mm at every 5 degrees from the center front of the image display device 100 with a brightness meter having the measurement range of 1 degree. The measurement result is shown in FIG. 5.

As a comparative example, the image display device without the above viewing angle controller 200 and with the lenticular lens sheet having the 40 µm lens pitch is used for the same experiment of the first embodiment. The result is also shown in FIG. 5.

Figure 5:
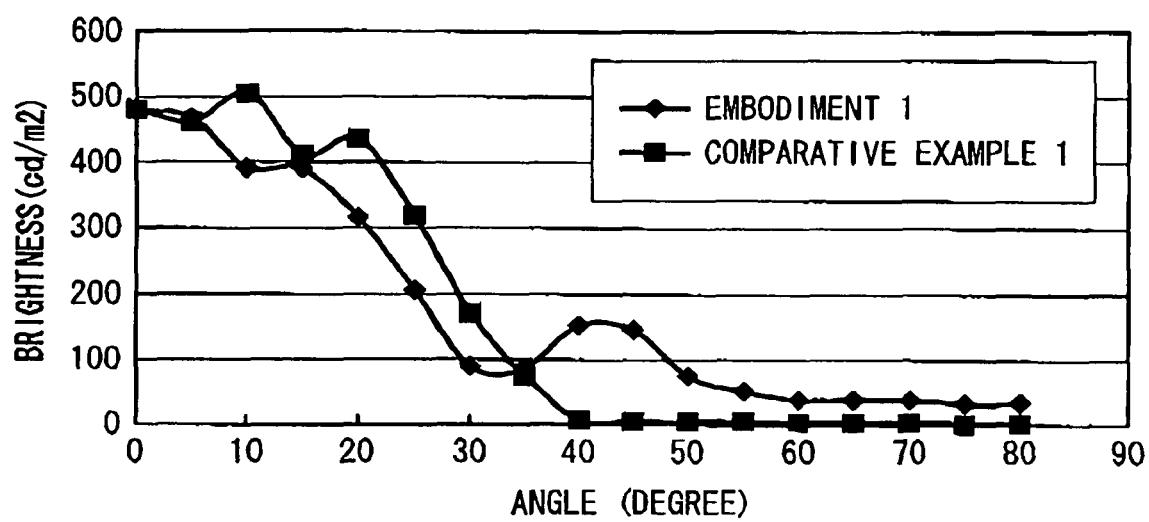
FIG. 5 shows the result of the experiment in the first embodiment.

As shown in FIG. 5, with the viewing angle controller 200, the brightness in the range between about 40 degrees and about 55 degrees is higher than that without the viewing angle controller 200. In this range, therefore, the image can be displayed more clearly to the viewer 10. FIG. 5 shows the brightness of around 30 degrees is decreased, but this can be increased by controlling the diffusing direction of the viewing angle controller 200.

Figure 6:
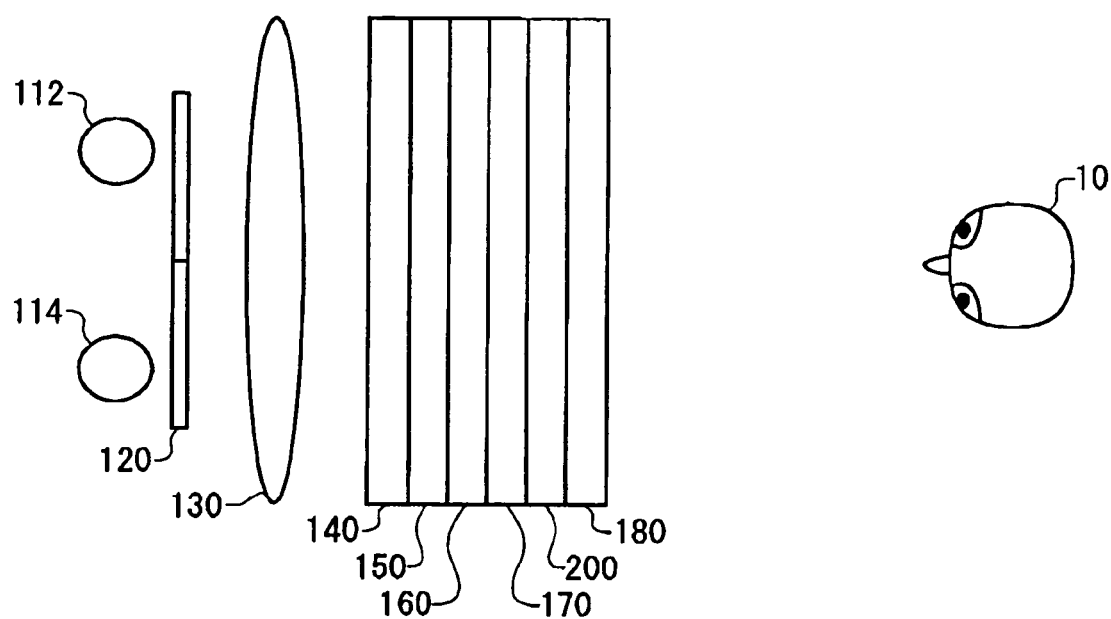
FIG. 6 is a schematic view of another example of how to assemble the viewing angle controller 200 in the image display device 100.

FIG. 6 is a schematic plane view shown another example of where to assemble the viewing angle controller 200 in the image display device 100. In FIG. 6, same reference numbers stand for the same components shown in FIGS. 1-5 so that the description thereof is omitted.

The different point in the image display device 100 shown in FIG. 6 from those shown in the FIGS. 1-5 is that the viewing angle controller 200 is assembled between the liquid crystal polarizer 170 and the unidirectional diffuser 180. The viewing angle controller 200 in this position diffuses the outside light entering the unidirectional diffuser 180 so that the outside light is prevented from reflecting.

Figure 7:
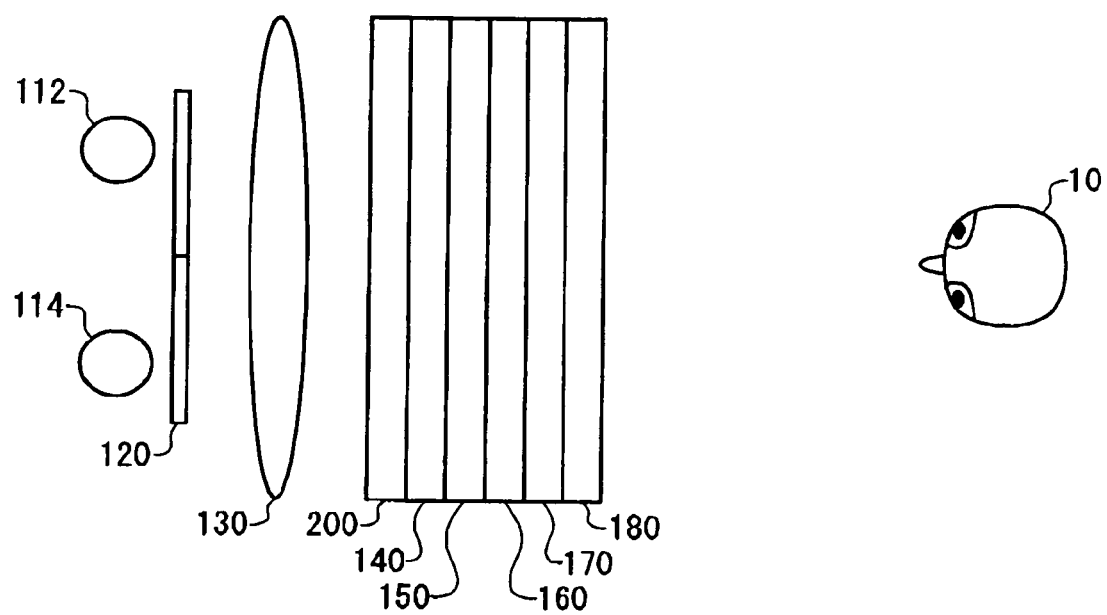
FIG. 7 is a schematic plane view of one other example of how to assemble the viewing angle controller 200 in the image display device 100.

FIG. 7 is a schematic plane view of another example of where to assemble the viewing angle controller 200. In FIG. 7, same reference numbers stand for the same components shown in FIGS. 1-5 so that the description thereof is omitted. The different point in the image display device 100 shown in FIG. 7 from those shown in the FIGS. 1-5 is that the viewing angle controller 200 is assembled between the condenser lens 130 and the micropatterned retarder 140.

Figure 8:
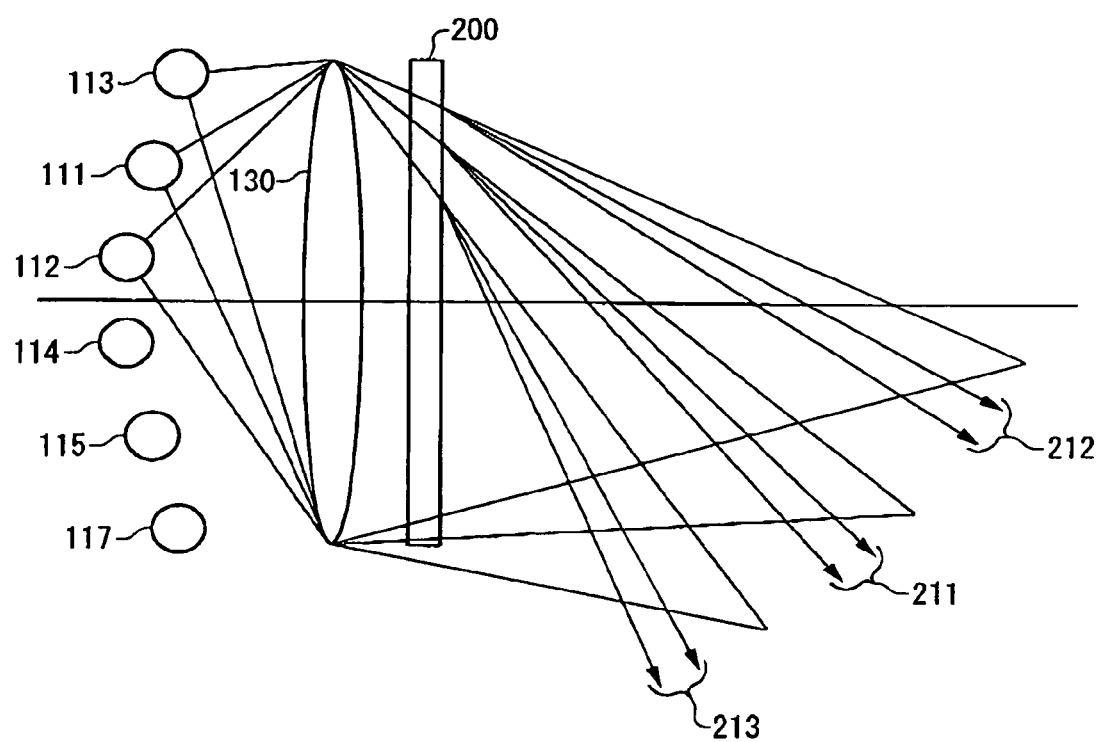
FIG. 8 is a schematic plane view of another example of the light source unit 110 in the image display device 100.

FIG. 8 is a schematic plane view showing another example of the light source unit 110. In the light source unit 110 shown in FIG. 8, a plurality of the left eye lighting components 112, 111, and 113 is aligned in the right side of the optical center of the image display device 100, and a plurality of the right eye lighting components 114, 115, and 117 is aligned in the left side of the optical center of the image display device 100.

In this system, the viewing angle controller 200 produces the diffused light 212 which is diffused and spread into the left side from the direction in which the light emitted from the left eye lighting component 112 is focused by the condenser lens 130. Similarly, the viewing angle controller 200 produces the diffused lights 211 and 213 which are diffused and spread into the left side from the direction in which the light emitted from the left eye lighting components 111 and 113 are focused by the condenser lens 130. The diffused lights related to the lights emitted from a plurality of the left eye lighting components 112, 111, and 113 can be spread more widely to display the left eye image in wider area. Similarly, the viewing angle controller 200 produces the diffused light which is diffused and spread into the right side from the direction in which each light emitted from a plurality of right eye lighting components 114, 115, and 117 is focused. The diffused lights related to the lights emitted from a plurality of the right eye lighting components 114, 115, and 117 can be spread more widely to display the right eye image in wider area In the system shown in FIG. 8, the light having the incident angle which is equal to or larger than the angle $\theta_2$ instead of the angle $\theta_1$ may be diffused and spread. Here, $\theta_2$ is defined as $\theta_2 = \tan^{-1}((y_1 + y_2)/x)$.

According to the system shown in FIG. 8, a two dimensional (2D) image can be displayed in wider range to the viewer 10 in front of the image display device 100 without cross-talk.

In the system of the above embodiment, the image display device 100 displays a 3D image. The image display device 100 may be, however, a 2D image display device which displays a 2D image. The image display device 100 may also be an image display device which switches between a 3D image and a 2D image to be displayed. In this case, the viewing angle controller 200 is employed so that the 2D image can be displayed to the viewer 10 in front of the image display device 100 without cross-talk and another viewer 10 who isn't in the front of the image display device 100 can see the 2D image without perceiving flicker.

The above description explaining the present invention with the embodiments does not limit the technical scope of the invention to the above description of the embodiments. It is apparent for those in the art that various modifications or improvements can be made to the embodiments described above. It is also apparent from what we claim that other embodiments with such modifications or improvements are included in the technical scope of the present invention.

What is claimed is:

1. An image display device projecting an image on a viewer which includes:
    a light source unit from which light is emitted to a viewer;
    an imaging section in which an image is formed;
    optical means through which the light emitted from said light source unit is transmitted to enter said imaging section; and
    a viewing angle controller configured and operable to diffuse light directed to the left eye of the viewer only to the left eye and to the left of the left eye of the viewer from the viewer's perspective, and diffuse light directed to the right eye of the viewer only to the right eye and to the right of the right eye of the viewer from the viewer's perspective.

2. The image display device according to claim 1, wherein said light source unit includes a lighting component for left eye which emits light to the left eye of said viewer and a lighting component for right eye which emits light to the right eye of said viewer, wherein said imaging section includes left eye image forming regions in which an image for left eye of the parallax images is formed and right eye image forming regions in which an image for right eye of the parallax images is formed, and
    wherein said optical means allows the light emitted from said left eye lighting component to enter said left eye image forming regions of said imaging section and the light emitted from said right eye lighting component to enter said right eye image forming regions of said imaging section.

3. The image display device according to claim 1, wherein said viewing angle controller diffuses and spreads the incident light having an incident angle equal to or larger than the angle $\theta_1$ in the direction of a larger angle than the incident angle,
    wherein the $\theta_1$ is defined as $\theta_1 = \tan^{-1}((y_1 - y_2)/x)$ where $y_1$ is the half of the horizontal effective length of said image display device, $y_2$ is the half of the distance between said left eye and said right eye of said viewer, and x is the distance between said image display device and said viewer.

4. The image display device according to claim 1 which further includes a unidirectional diffuser through which diffuses and spreads the light exiting from said imaging section in vertical direction.

5. The image display device according to claim 4, wherein said viewing angle controller is assembled closer to said viewer than said unidirectional diffuser.

6. The image display device according to claim 4, wherein said viewing angle controller is assembled between said imaging section and said unidirectional diffuser.

7. The image display device according to claim 2, wherein said optical means includes:
    a light source unit polarizer set which polarizes the lights emitted from said left eye lighting component and said right eye lighting component to give respective polarizing directions which are perpendicular to each other;
    a condenser lens by which the light emitted from said left eye lighting component and polarized by said light source unit polarizer set is transmitted and focused on said left eye of said viewer and the light emitted from said right eye lighting component and polarized by said light source unit polarizer set is transmitted and focused on said right eye of the viewer; and
    a micropatterned retarder which modifies the incident lights entering said left eye image forming regions and said right eye image forming regions to make the respective polarization directions perpendicular to each other,
    wherein said viewing angle controller is assembled between said condenser lens and said micropatterned retarder.

8. The image display device according to claim 2, wherein said viewing angle controller diffuses and spreads the incident light having an incident angle equal to or larger than the angle $\theta_1$ in the direction of a larger angle than the incident angle,
    wherein the $\theta_1$ is defined as $\theta_1 = \tan^{-1}((y_1 - y_2)/x)$ where $y_1$ is the half of the horizontal effective length of said image display device, $y_2$ is the half of the distance between said left eye and said right eye of said viewer, and x is the distance between said image display device and said viewer.

9. The image display device according to claim 2 which further includes a unidirectional diffuser through which diffuses and spreads the light exiting from said imaging section in vertical direction.

10. The image display device according to claim 3 which further includes a unidirectional diffuser through which diffuses and spreads the light exiting from said imaging section in vertical direction.

11. The image display device according to claim 3, wherein said optical means includes:
    a light source unit polarizer set which polarizes the lights emitted from said left eye lighting component and said right eye lighting component to give respective polarizing directions which are perpendicular to each other;
    a condenser lens by which the light emitted from said left eye lighting component and polarized by said light source unit polarizer set is transmitted and focused on said left eye of said viewer and the light emitted from said right eye lighting component and polarized by said light source unit polarizer set is transmitted and focused on said right eye of the viewer; and
    a micropatterned retarder which modifies the incident lights entering said left eye image forming regions and said right eye image forming regions to make the respective polarization directions perpendicular to each other,
    wherein said viewing angle controller is assembled between said condenser lens and said micropatterned retarder.

12. The image display device according to claim 4, wherein said optical means includes:
    a light source unit polarizer set which polarizes the lights emitted from said left eye lighting component and said right eye lighting component to give respective polarizing directions which are perpendicular to each other;
    a condenser lens by which the light emitted from said left eye lighting component and polarized by said light source unit polarizer set is transmitted and focused on said left eye of said viewer and the light emitted from said right eye lighting component and polarized by said light source unit polarizer set is transmitted and focused on said right eye of the viewer; and a micropatterned retarder which modifies the incident lights entering said left eye image forming regions and said right eye image forming regions to make the respective polarization directions perpendicular to each other, wherein said viewing angle controller is assembled between said condenser lens and said micropatterned retarder.

13. The image display device according to claim 9, wherein said viewing angle controller is assembled closer to said viewer than said unidirectional diffuser.

14. The image display device according to claim 10, wherein said viewing angle controller is assembled closer to said viewer than said unidirectional diffuser.

15. The image display device according to claim 9, wherein said viewing angle controller is assembled between said imaging section and said unidirectional diffuser.

16. The image display device according to claim 10, wherein said viewing angle controller is assembled between said imaging section and said unidirectional diffuser.

17. The image display device according to claim 1, wherein the viewing angle controller is a polymer film through which incident light having an angle of incidence smaller than a threshold is transmitted directly, whereas incident light having an angle of incidence equal to or larger than the threshold is scattered.

* * * * *